United States Patent
Lepper (10) Patent No.: US 11,644,052 B2
(45) Date of Patent: May 9, 2023

(54) W-BASE FASTENER AND LOCATOR CAP

(71) Applicant: Illinois Tool Works Inc., Glenview, IL (US)

(72) Inventor: Mark O. Lepper, Oak Park, IL (US)

(73) Assignee: Illinois Tool Works Inc., Glenview, IL (US)

( * ) Notice: Subject to any disclaimer, the term of this patent is extended or adjusted under 35 U.S.C. 154(b) by 222 days.

(21) Appl. No.: 17/126,506

(22) Filed: Dec. 18, 2020

(65) Prior Publication Data

US 2021/0190109 A1 Jun. 24, 2021

Related U.S. Application Data

(60) Provisional application No. 62/949,569, filed on Dec. 18, 2019.

(51) Int. Cl.
*F16B 5/06* (2006.01)
*F16B 21/08* (2006.01)

(52) U.S. Cl.
CPC .......... *F16B 5/0657* (2013.01); *F16B 21/086* (2013.01)

(58) Field of Classification Search
CPC .............................. F16B 5/0657; F16B 21/086
See application file for complete search history.

(56) References Cited

U.S. PATENT DOCUMENTS

| | | | | |
|---|---|---|---|---|
| 3,776,092 A | * | 12/1973 | Seckerson | F16B 21/086 24/339 |
| 4,176,428 A | * | 12/1979 | Kimura | F16B 21/06 411/509 |
| 4,927,287 A | * | 5/1990 | Ohkawa | F16B 21/086 411/21 |
| 5,211,519 A | * | 5/1993 | Saito | F16B 19/1081 411/48 |
| 5,387,065 A | * | 2/1995 | Sullivan | F16B 19/1081 411/48 |
| 5,651,634 A | * | 7/1997 | Kraus | F16B 5/0628 D8/382 |
| 5,718,549 A | * | 2/1998 | Noda | F16B 5/0657 411/553 |
| 5,775,860 A | * | 7/1998 | Meyer | F16B 19/1081 411/41 |
| 6,769,849 B2 | * | 8/2004 | Yoneoka | F16B 19/1081 411/41 |
| 7,114,221 B2 | * | 10/2006 | Gibbons | F16B 21/082 24/336 |
| 7,186,068 B2 | * | 3/2007 | Zoubek | F16B 21/086 411/510 |

(Continued)

FOREIGN PATENT DOCUMENTS

WO 2009/019548 A2 2/2009

*Primary Examiner* — Jason W San
(74) *Attorney, Agent, or Firm* — Quarles & Brady LLP (57) ABSTRACT

A fastener assembly includes a fastener body, a locator cap, and a seal. The fastener body can include a first wing and a second wing that extend from a stem. The first wing can define a first wing tip and the second wing can define a second wing tip. The locator cap can include a top flange and a base. The top flange can define an opening to an interior of the base. A first slot can be formed in the base and can be dimensioned to receive the first wing. A second slot can be formed in the base opposite the first slot and can be dimensioned to receive the second wing. The seal can be in contact with the top flange.

19 Claims, 14 Drawing Sheets

(56) References Cited

U.S. PATENT DOCUMENTS

| | | | | |
|---|---|---|---|---|
| 7,237,995 B2* | 7/2007 | Randez Perez | F16B 19/1081 | 411/48 |
| 7,503,528 B2* | 3/2009 | Adams | F16L 3/137 | 24/297 |
| 7,549,199 B2* | 6/2009 | Bugner | F16B 5/0628 | 411/908 |
| 7,698,787 B2* | 4/2010 | Scroggie | F16B 21/082 | 411/24 |
| 7,862,275 B2* | 1/2011 | Jatzke | B60R 13/0206 | 411/48 |
| 7,878,749 B2* | 2/2011 | Edland | F16B 21/086 | 24/297 |
| 8,671,527 B2* | 3/2014 | Scroggie | F16B 21/082 | 24/453 |
| 8,677,573 B2* | 3/2014 | Lee | F16B 21/076 | 24/297 |
| 8,883,059 B2* | 11/2014 | Lewis | F16B 5/0657 | 264/250 |
| 9,145,909 B2* | 9/2015 | Lepper | F16B 21/082 | |
| 9,939,003 B2* | 4/2018 | Ormsby | F16B 5/0657 | |
| 10,099,628 B2* | 10/2018 | Kato | F16B 21/086 | |
| 10,100,860 B2* | 10/2018 | Kanie | F16B 19/00 | |
| 10,683,882 B2* | 6/2020 | Scroggie | F16B 19/008 | |
| 10,808,745 B1* | 10/2020 | Javali | F16B 21/086 | |
| 10,914,336 B2* | 2/2021 | Edland | F16B 21/086 | |
| 10,941,806 B2* | 3/2021 | Zander | F16B 43/001 | |
| 10,989,239 B2* | 4/2021 | Rassam | F16B 5/0657 | |
| 10,995,783 B2* | 5/2021 | Dickinson | F16B 5/0657 | |
| 2006/0231690 A1* | 10/2006 | Cooley | F16B 21/086 | 248/71 |
| 2008/0052878 A1* | 3/2008 | Lewis | F16B 19/008 | 24/297 |
| 2008/0066266 A1* | 3/2008 | Scroggie | F16B 21/086 | 24/297 |
| 2008/0298925 A1* | 12/2008 | Shinozaki | F16B 19/1081 | 411/48 |
| 2011/0014005 A1* | 1/2011 | Shinozaki | F16B 21/086 | 411/347 |
| 2011/0197405 A1* | 8/2011 | Kato | F16B 21/065 | 24/530 |
| 2012/0174345 A1* | 7/2012 | Scroggie | F16B 5/123 | 24/297 |
| 2014/0047679 A1* | 2/2014 | Lepper | F16B 21/082 | 24/453 |
| 2014/0050548 A1* | 2/2014 | Loewe | F16B 5/0657 | 411/48 |
| 2015/0135484 A1* | 5/2015 | Leverger | F16B 13/045 | 24/292 |
| 2015/0282575 A1* | 10/2015 | Smith | A43B 1/14 | 63/3 |
| 2015/0322985 A1* | 11/2015 | Scroggie | F16B 19/008 | 24/458 |
| 2016/0146239 A1* | 5/2016 | Nazzari | G09F 3/0317 | 70/232 |
| 2017/0051780 A1* | 2/2017 | Dickinson | F16B 21/076 | |
| 2017/0198738 A1* | 7/2017 | Najima | F16B 13/06 | |
| 2017/0307003 A1* | 10/2017 | Edland | F16B 21/082 | |
| 2017/0335877 A1* | 11/2017 | Steltz | F16B 5/06 | |
| 2018/0100531 A1* | 4/2018 | Flynn | F16B 21/086 | |
| 2019/0113062 A1* | 4/2019 | Liu | F16B 13/124 | |
| 2019/0323530 A1* | 10/2019 | Lee | F16B 5/0657 | |
| 2020/0141440 A1* | 5/2020 | Liebelt | F16B 21/086 | |
| 2020/0217345 A1* | 7/2020 | Liebelt | F16B 19/1081 | |
| 2020/0339045 A1* | 10/2020 | Dickinson | B60R 13/0206 | |
| 2022/0099119 A1* | 3/2022 | Dickinson | F16B 5/0657 | |

* cited by examiner

W-BASE FASTENER AND LOCATOR CAP

CROSS REFERENCE TO RELATED APPLICATIONS

This application is based on, claims priority to, and incorporates herein by reference in its entirety U.S. Provisional Application No. 62/949,569, filed on Dec. 18, 2019.

BACKGROUND

1. Field of the Disclosure

Embodiments of the present disclosure generally relate to fasteners used to join components to a vehicle body.

2. Description of the Background

In many assemblies, including automobile assemblies, it can be necessary to connect one panel or object to another panel or object. For example, in the construction of automobiles, various panels and structures are often connected to other panels, structures, or the automobile frame using press-fit fasteners. Such fasteners can have a head portion and a base clip portion with a generally arrowhead shape projecting away from the head portion. The head of such fasteners can be attached to an attachment structure such as a doghouse, return flange, or other component while the base clip projects outwardly for insertion into an opening within a second component to create a connection.

Fasteners having a generally W-shaped base portion can only control movement in a single direction within a hole of the panel in which the fastener is installed. It can be advantageous to rigidly control the position of the fastener within a hole. Additionally, when a fastener is rigidly positioned within a hole, the fastener can function as a locator, thereby providing a datum for the overall assembly.

SUMMARY

In one aspect, a fastener assembly includes a fastener body, a locator, and a seal. The fastener body can include a first wing and a second wing that extend from a stem. The first wing can define a first wing tip and the second wing can define a second wing tip. The locator cap can include a top flange and a base. The top flange can define an opening to an interior of the base. A first slot can be formed in the base and can be dimensioned to receive the first wing. A second slot can be formed in the base opposite the first slot and can be dimensioned to receive the second wing. The seal can be in contact with the top flange.

In some embodiments, a fastener assembly can include a fastener body, first and second opposing wings, a locator cap, and a seal. The fastener body can define a head portion and a base portion. The first and second opposing wings can extend from the base portion and can be configured to engage a surface that forms a perimeter of a hole in a panel. The locator cap can include a top flange and a base extending therefrom that terminates in a tapered end. The seal can be overmolded around the top flange.

In some embodiments, a fastener assembly can include a fastener body, first and second opposing wings, a locator cap, first and second opposing slots, and a seal. The fastener body can include a radial flange and a stem that extends from the radial flange. The first and second opposing wings can extend from the stem opposite the radial flange. Each of the first and second opposing wings can terminate in respective first and second wing tips. The locator cap can include a top flange and a base extending from the top flange. The first and second opposing slots can be formed in the base and can be dimensioned to receive the first and second opposing wings. The seal can be overmolded to the radial flange.

BRIEF DESCRIPTION OF THE DRAWINGS

The invention will be better understood and features, aspects, and advantages other than those set forth above will become apparent when consideration is given to the following detailed description thereof. Such detailed description makes reference to the following drawings.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE DRAWINGS

Embodiments of the present disclosure provide a fastener assembly for automobiles that can provide a seal around an opening, rigidly control movement of a fastener within the plane of the opening, and provide a relatively higher level of locating performance within the opening.

Figure 1:
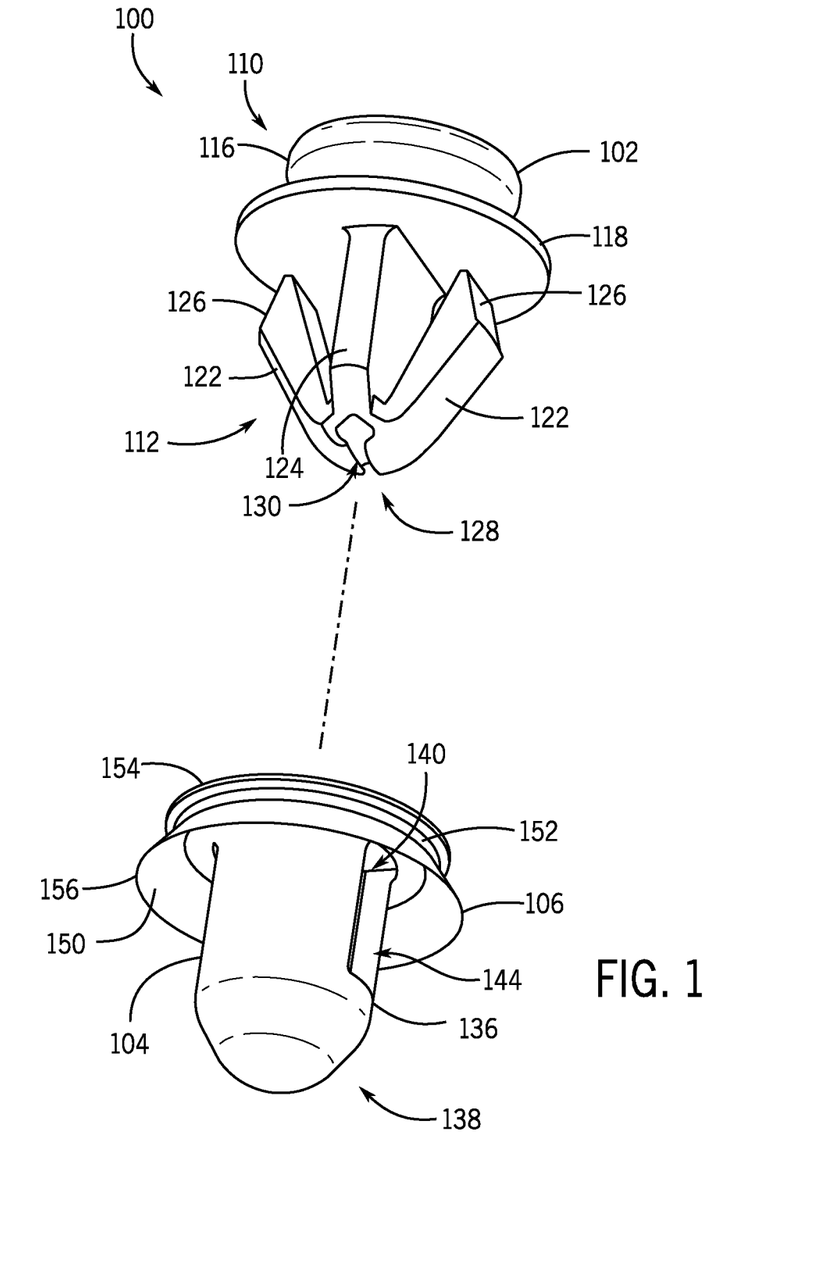
FIG. 1 is an isometric exploded view of a fastener assembly according to an embodiment of the present disclosure.

A fastener assembly 100, according to an embodiment of the present disclosure is depicted in FIGS. 1-8. With reference to FIG. 1, the fastener assembly includes a fastener body 102 and a locator cap 104. The fastener assembly 100 also includes a seal 106. In the illustrated embodiment, the seal 106 is overmolded onto the locator cap 104.

Figure 2:
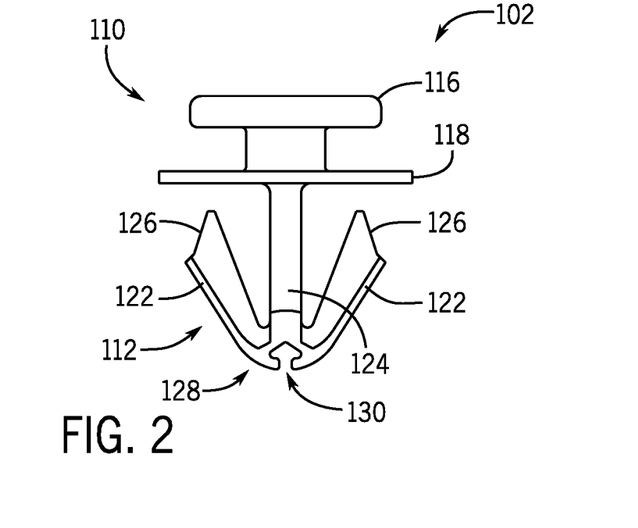
FIG. 2 is a side view of a fastener body of the fastener assembly of FIG. 1.

With reference to FIG. 2, the fastener body 102 includes a head portion 110 and a base portion 112. The head portion 110 includes a head 116 and a flange 118 that is spaced apart from the head 116. The base portion 112 includes first and second wings 122 that extend at an angle from opposing sides of a stem 124. Each of the first and second wings 122 includes respective first and second wing tips 126 that are angled with respect to the wings 122. At a distal end of the stem 124, the wings 122 form a nose 128. In the illustrated embodiment, the nose 128 includes an opening 130.

In general, the fastener body 102 is configured as a W-base fastener with the nose 128 being rounded. In other embodiments, the fastener assembly 100 can include a fastener body that is configured as a W-prong fastener having a relatively pointy nose. Additionally, in some embodiments, the nose 128 of the fastener body 102 may be solid (i.e., without the opening 130).

Figure 3:
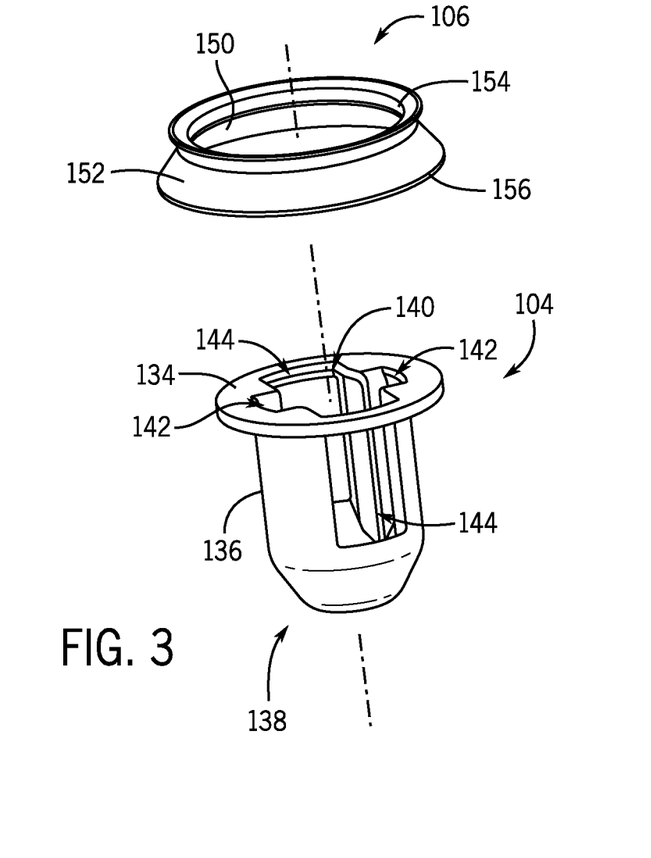
FIG. 3 is an isometric exploded view of a seal and a locator camp of the fastener assembly of FIG. 1.

With reference to FIG. 3, and as briefly discussed above, the locator cap 104 can include the seal 106. In the illustrated embodiment, the seal 106 is overmolded to the locator cap 104 during a manufacturing process of the locator cap 104. The locator cap 104 includes a flange surface 134 and a base 136 extending therefrom. The base 136 extends substantially perpendicularly from the flange surface 134 and terminates at a tapered end 138. The flange surface 134 includes an opening 140. In general, the opening 140 provides access to an interior of the locator cap 104 defined by the base 136. In the illustrated embodiment, the opening 140 includes opposing lateral cutouts 142. The lateral cutouts 142 facilitate inserting the fastener body 102 into the interior of the locator cap 104.

Still referring to FIG. 3, the base 136 includes opposing slots 144. The opposing slots 144 extend between the flange surface 134 and the tapered end 138. The opposing slots 144 are dimensioned to receive the wings 122 of the fastener body 102 so that the wings 122 at least partially extend from the interior of the base 136 when the fastener body 102 is inserted into the locator cap 104. In the illustrated embodiment, the opposing slots 144 are radially offset from the lateral cutouts 142 by approximately 90 degrees. However, in other embodiments, other angles are possible.

With continued reference to FIG. 3, the seal 106 defines an interior surface 150 and an exterior surface 152. Additionally, the seal 106 includes a first flared portion 154 and a second flared portion 156. During a manufacturing process, the seal 106 can be overmolded onto the flange surface 134 of the locator cap 104 so that the flange surface 134 engages the seal 106 at the interior surface 150 proximate to the first flared portion 154.

Figure 4:
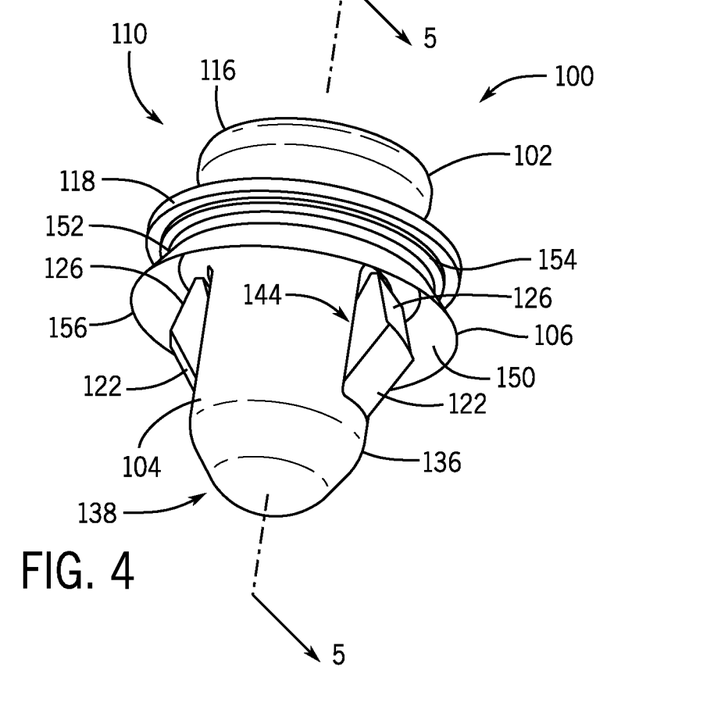
FIG. 4 is an isometric view of the fastener assembly of FIG. 1.
Figure 5:
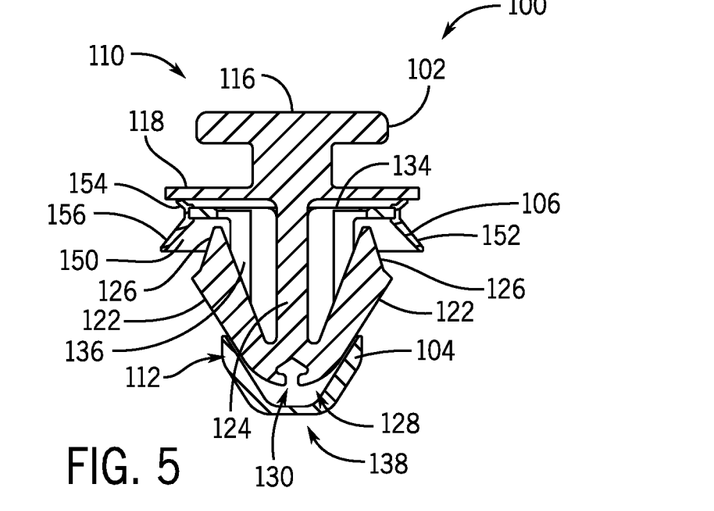
FIG. 5 is a cross-sectional side view of the fastener assembly of FIG. 1 taken along the line 5-5 of FIG. 4.

FIGS. 4 and 5 illustrate the fastener assembly 100 with the fastener body 102 inserted into the locator cap 104. As briefly discussed above, when the fastener body 102 is inserted into the locator cap 104, the wings 122 extend through the opposing slots 144. When the wings 122 extend through the opposing slots 144, the wing tips 126 are disposed proximate to the interior surface 150 of the second flared portion 156 of the seal 106. In particular, as shown in FIG. 5, the wing tips 126 are surrounded (e.g., encircled) by the second flared portion 156 of the seal 106.

Figure 6A:
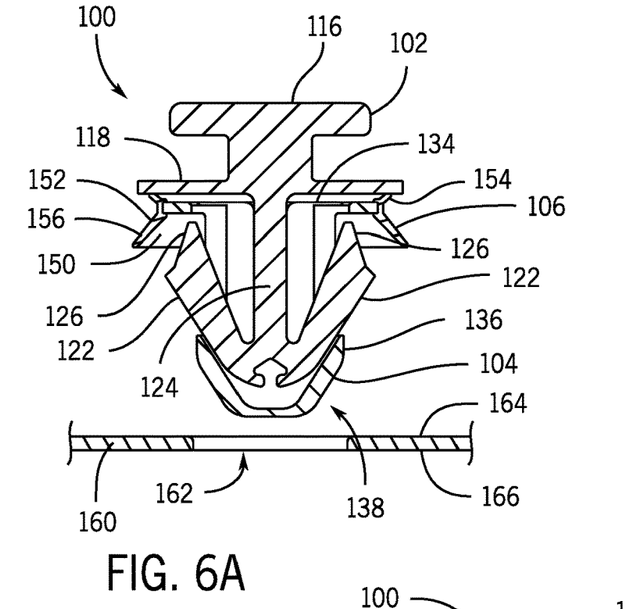
FIG. 6A is a cross-sectional side view of the fastener assembly of FIG. 1 and a panel.
Figure 6B:
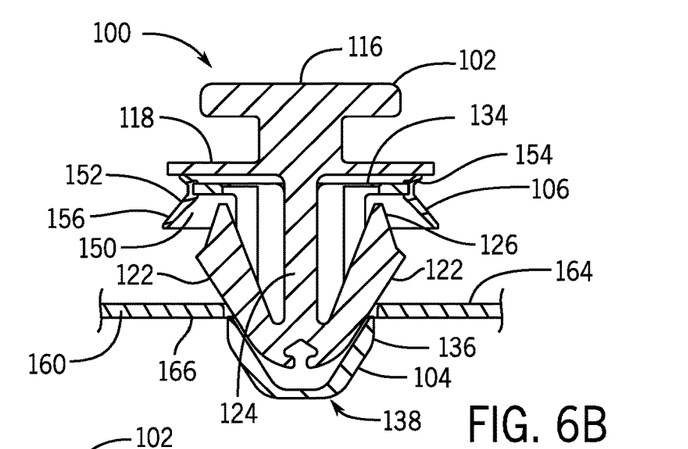
FIG. 6B is a cross-sectional side view of the fastener assembly of FIG. 1 partially assembled with the panel of FIG. 6A.
Figure 6C:
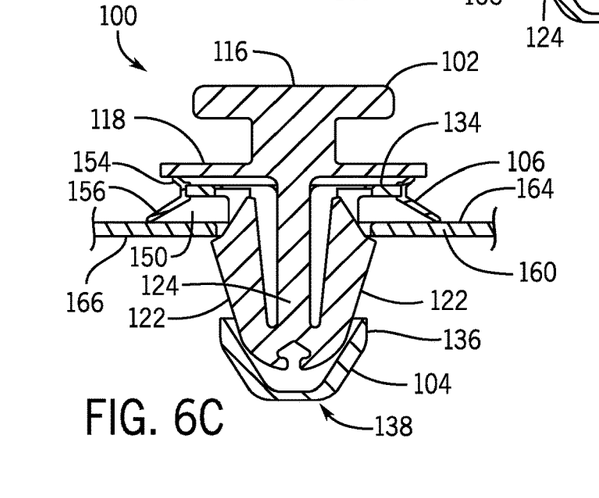
FIG. 6C is a cross-sectional side view of the fastener assembly of FIG. 1 assembled with the panel of FIG. 6A.

With reference to FIGS. 6A-6C, the fastener assembly 100 can be assembled with a panel 160, such as a doghouse, for example. In the illustrated example, the panel 160 includes an opening 162 formed therein. As depicted in FIG. 6A the fastener assembly 100 can be aligned with the opening 162 in the panel 160 so that the tapered end 138 of the locator cap 104 is proximate the opening 162. As depicted in FIG. 6B, the fastener assembly 100 can be moved through the opening 162 (e.g., via force applied to the head 116 of the fastener body 102). Finally, as depicted in FIG. 6C, the fastener assembly 100 can be fully assembled with the panel 160 so that the second flared portion 156 is in contact with an outer surface 164 of the panel and the wings 122 are engaged with a surface that forms a perimeter of the opening 162.

Figure 7:
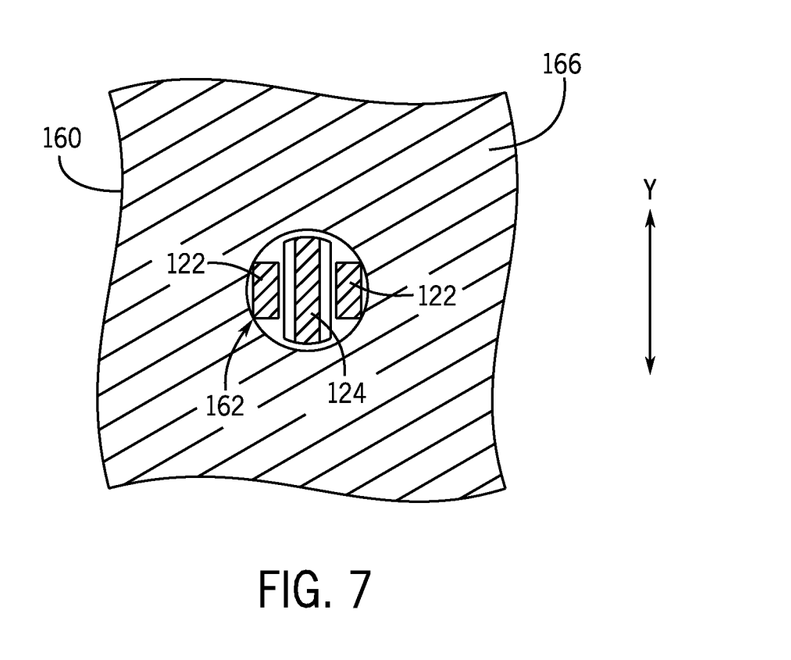
FIG. 7 is a bottom view of the fastener assembly assembled with the panel of FIG. 6C without the locator cap.

FIG. 7 illustrates a bottom surface 166 of the panel 160 with only the fastener body 102 extending through the opening 162. In the scenario where only the fastener body 102 extends though the opening 162 (i.e., without the locator cap 104), only an outer surface of the wings 122 engages the surface that forms the perimeter of the opening 162. As a result, the fastener body 102 provides resistance to movement of the panel 160 in a single direction. In the illustrated example, the single direction is denoted as the Y direction. In general, the wings 122 are biased radially outward.

Figure 8:
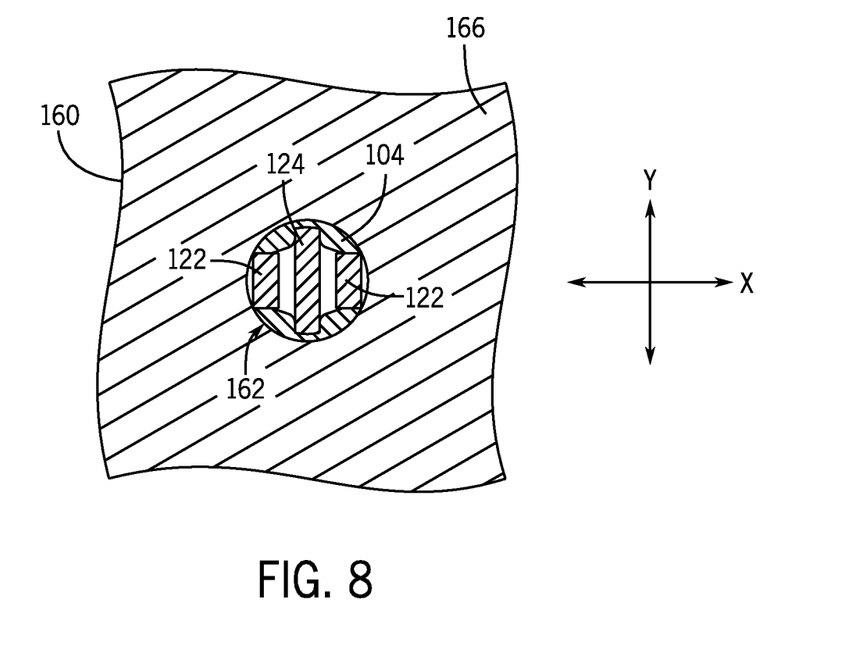
FIG. 8 is a bottom view of the fastener assembly assembled with the panel of FIG. 6C with the locator cap.

FIG. 8, on the other hand, illustrates the bottom surface 166 of the panel 160 with the fastener body 102 and the locator cap 104 of the fastener assembly 100 extending through the opening 162. As shown each of the wings 122 of the fastener body 102 and the base 136 of the locator cap 104 engage the surface that forms the perimeter of the opening 162. In some examples, the entire surface that forms the perimeter of the opening 162 is either engaged with the wings 122 or the base 136 of the locator cap. As a result, the fastener assembly 100 provides resistance to movement of the panel 160 in any direction within the plane of the opening 162. In the illustrated example, the plane is denoted via X and Y directions.

Figure 9:
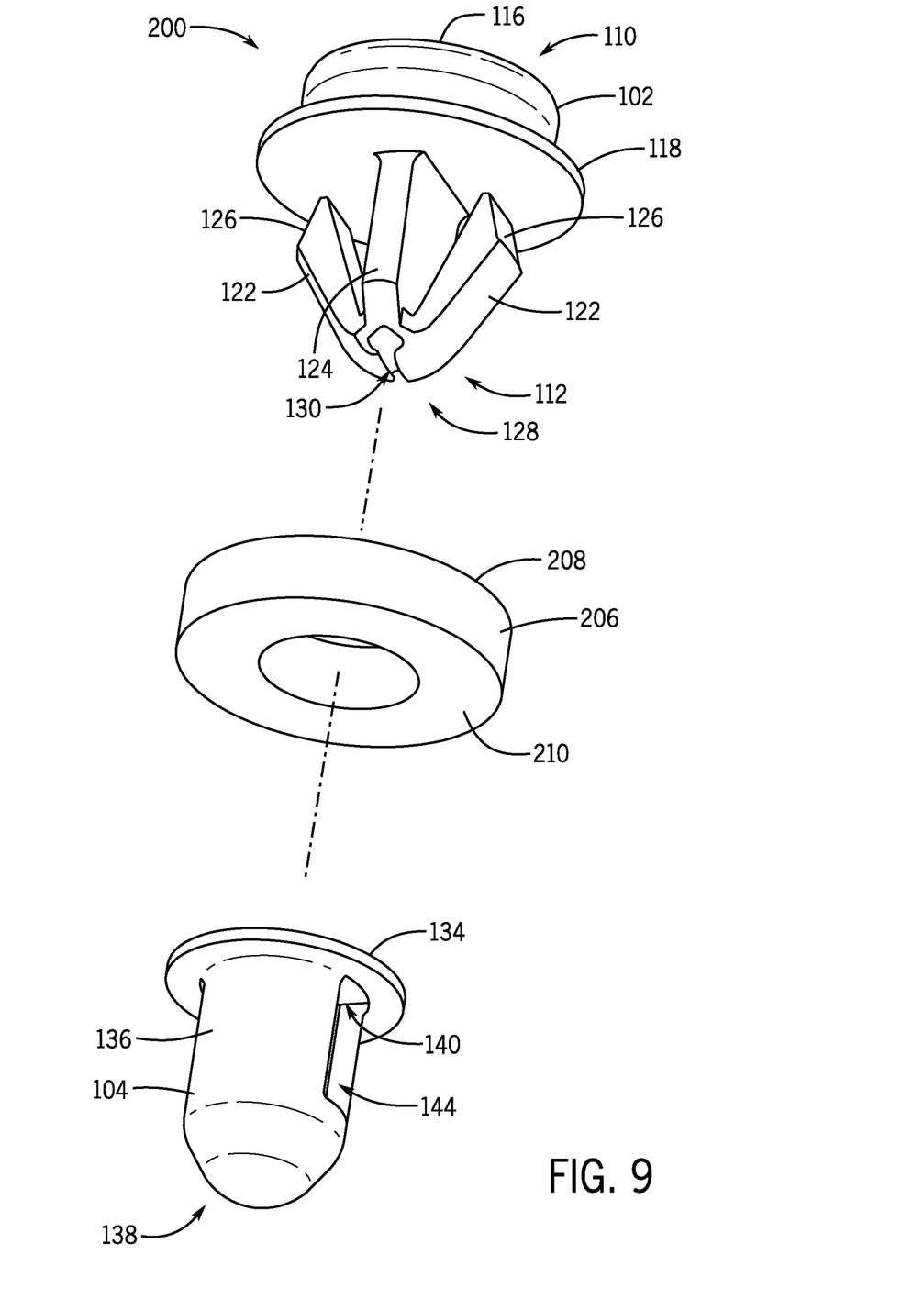
FIG. 9 is an isometric exploded view of a fastener assembly according to another embodiment of the present disclosure.
Figure 10:
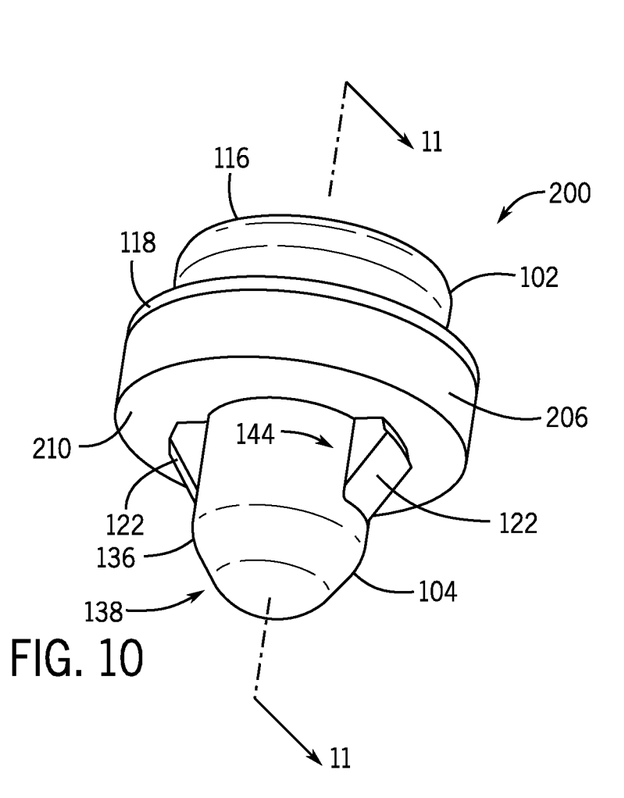
FIG. 10 is an isometric view of the fastener assembly of FIG. 9.
Figure 11:
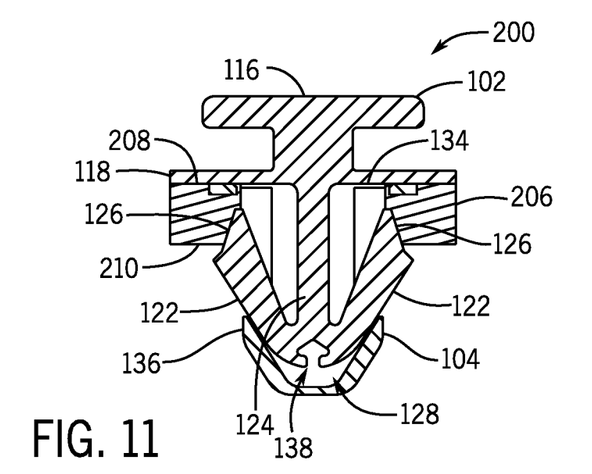
FIG. 11 is a cross-sectional side view of the fastener assembly of FIG. 9 taken along the line 11-11 of FIG. 10.

FIGS. 9-12 depict a fastener assembly 200 according to another embodiment of the present disclosure. With reference to FIG. 9, the fastener assembly 200 includes the fastener body 102, the locator cap 104, and a seal 206. The seal 206, unlike the seal 106 of the fastener assembly 100, is not overmolded to the locator cap 104. Rather, the seal 206 can be secured to the fastener assembly 200 between the flange 118 and the wings 122 of the fastener body 102 when the fastener body 102 is inserted into the locator cap, as illustrated in FIGS. 10 and 11. The seal 206 is configured as an annular ring defining a top surface 208 and a bottom surface 210.

With reference to FIGS. 10 and 11, the fastener body 102 can be inserted through the seal 206 and into the locator cap 104. In particular, as shown in FIG. 11, when the fastener assembly 200 is assembled, the flange 118 can engage the top surface 208 of the seal 206 and the wing tips 126 can engage the bottom surface 210 of the seal. In the illustrated embodiment, the flange 118 of the fastener body 102 is substantially flush with the top surface 208.

Figure 12:
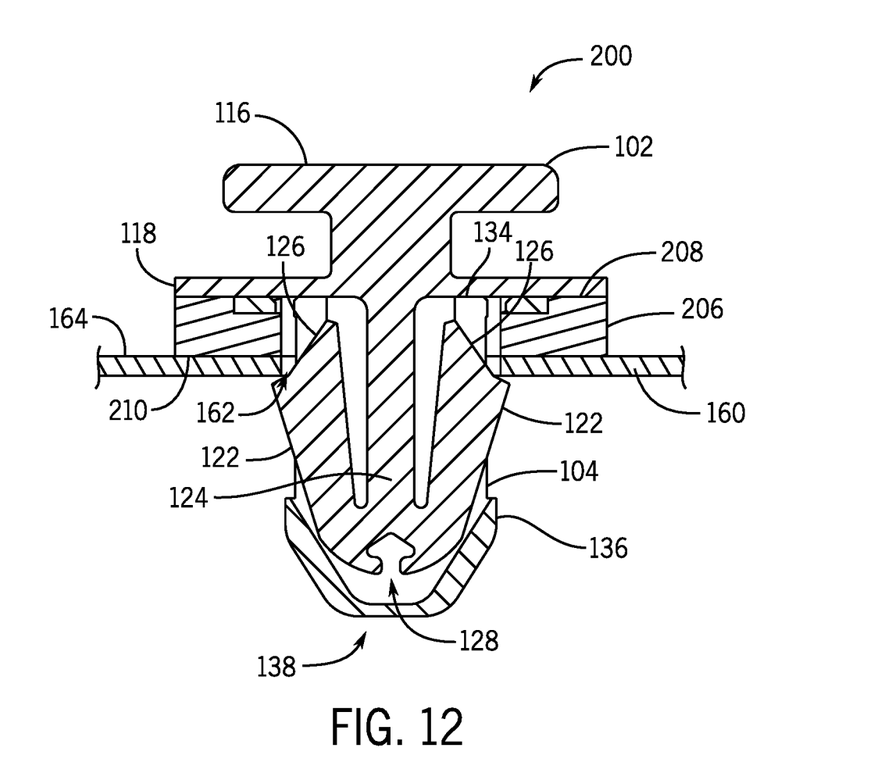
FIG. 12 is a cross-sectional side view of the fastener assembly of FIG. 9 assembled with a panel.

With reference to FIG. 12, the fastener assembly 200 can be assembled with a panel 160, similar to the fastener assembly 100. In particular, FIG. 12 illustrates the fastener assembly 200 fully assembled with the panel 160 so that the bottom surface 210 of the seal 206 is in contact with an outer surface 164 of the panel 160 and the wings 122 are engaged with a surface that forms a perimeter of an opening 162 in the panel 160. Likewise, the base of the locator cap 104 is also in contact with the surface that forms the perimeter of the opening 162. The assembly of the fastener assembly 200 with the panel 160 provides a similar resistance to movement, as described above with reference to FIG. 8.

Figure 13:
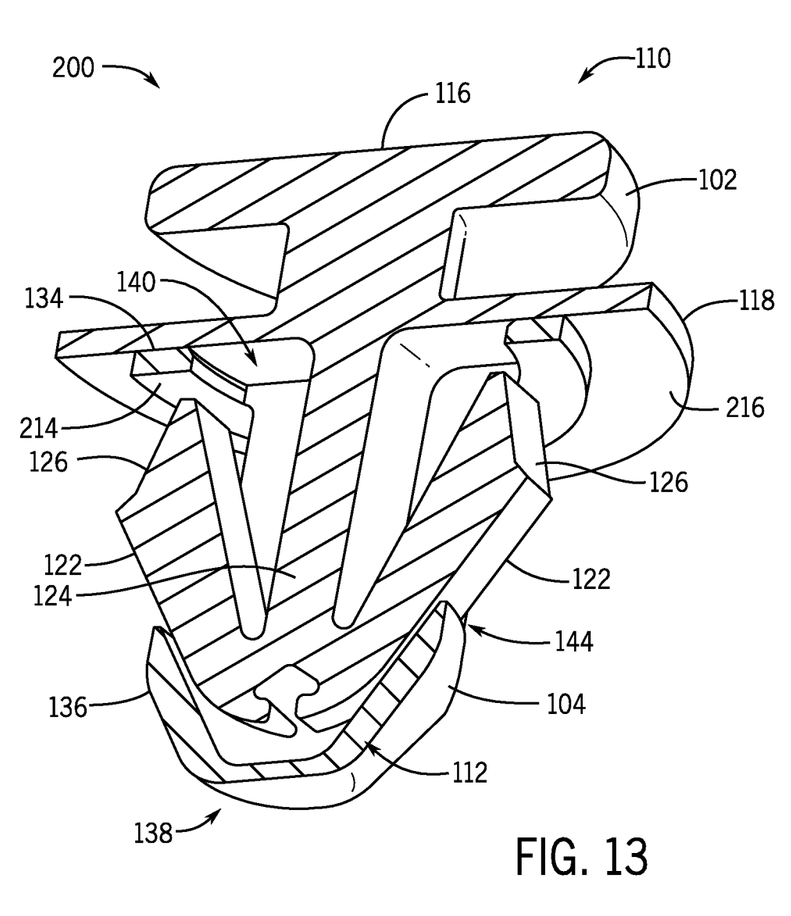
FIG. 13 is a cross-sectional isometric view of another configuration of the fastener assembly of FIG. 9.

In some embodiments, with reference to FIG. 13, the fastener assembly 200 can be used without the seal 206. In such configurations, a bottom surface 214 opposite the flange surface 134 of the locator cap 104 can contact an outer surface of a panel when the fastener assembly 200 is installed to the panel. Likewise, a bottom surface 216 of the flange 118 of the fastener body 102 can contact the flange surface 134 of the locator cap 104.

Figure 14:
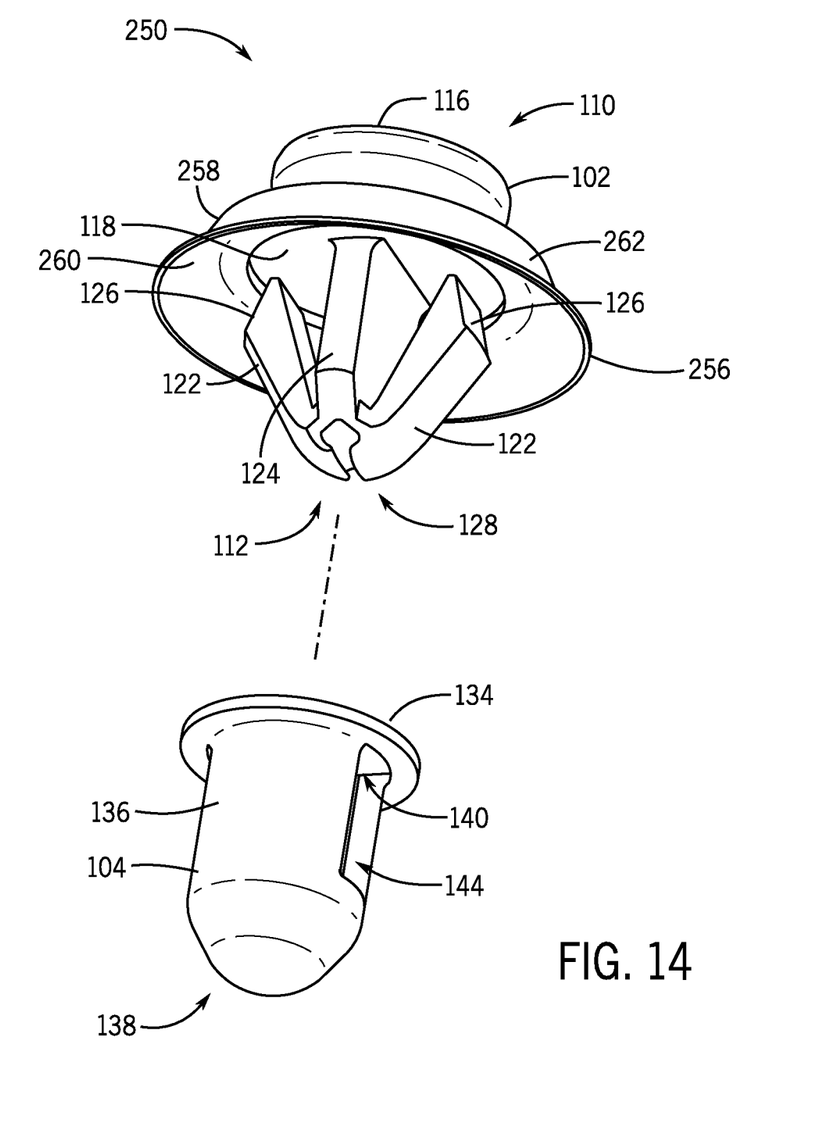
FIG. 14 is an isometric exploded view of a fastener assembly according to another embodiment of the present disclosure.
Figure 15:
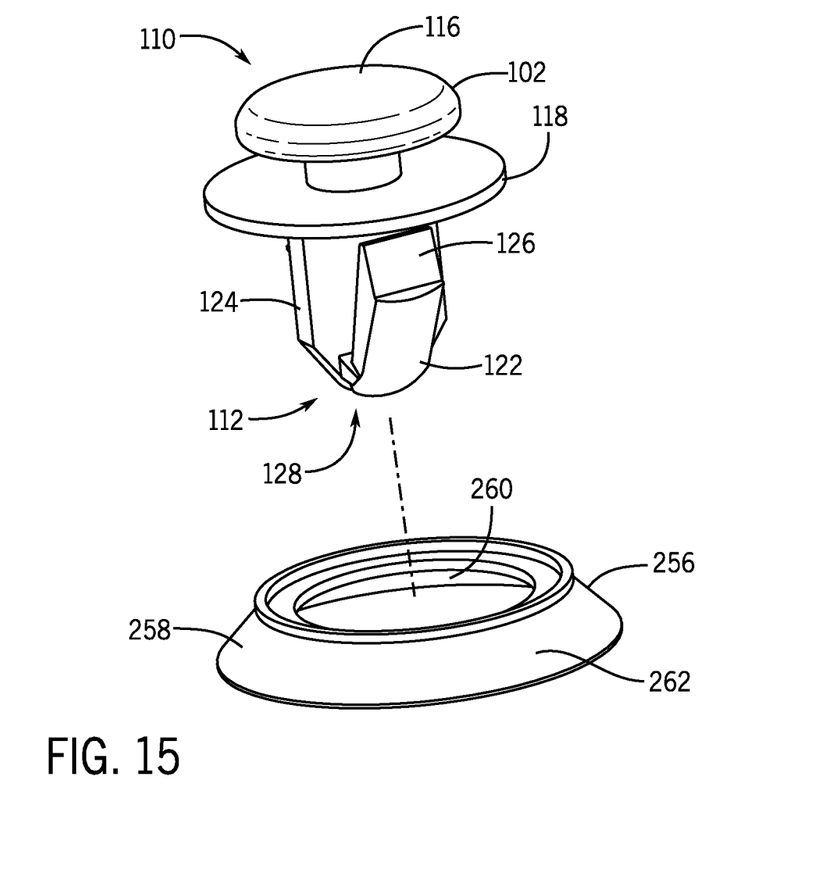
FIG. 15 is an isometric exploded view of a fastener body and a seal of the fastener assembly of FIG. 14.

FIGS. 14-18 depict a fastener assembly 250 according to another embodiment of the present disclosure. With reference to FIGS. 14 and 15, the fastener assembly 250 includes the fastener body 102, the locator cap 104, and a seal 256. Unlike the seals 106, 206 of the fastener assemblies 100, 200, the seal 256 can be overmolded on the fastener body 102 during a manufacturing process. In the illustrated embodiment, the seal 256 includes a sloped portion 258 and defines an interior surface 260 and an exterior surface 262. As illustrated in FIG. 15, the sloped portion 258 of the seal 256 generally slopes radially outward and downward.

Figure 16:
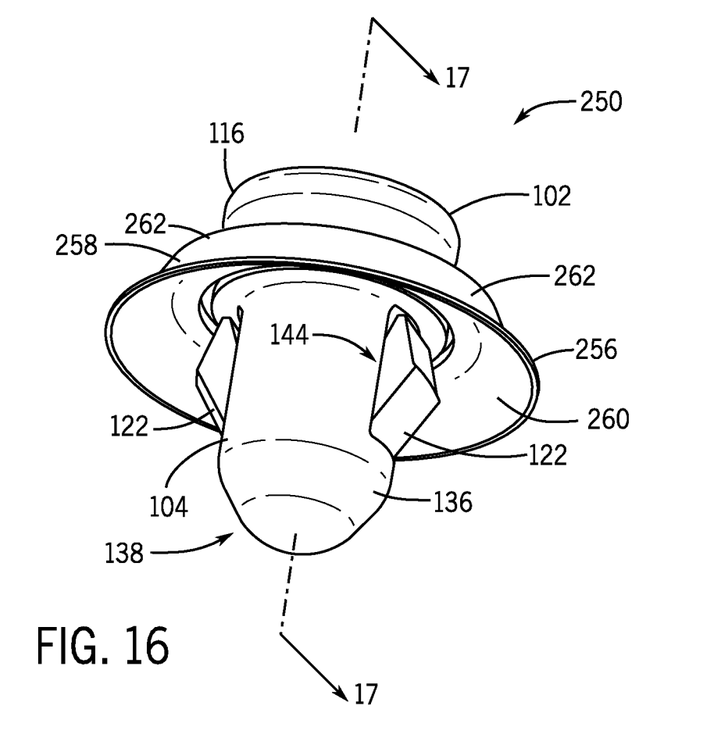
FIG. 16 is an isometric view of the fastener assembly of FIG. 14.
Figure 17:
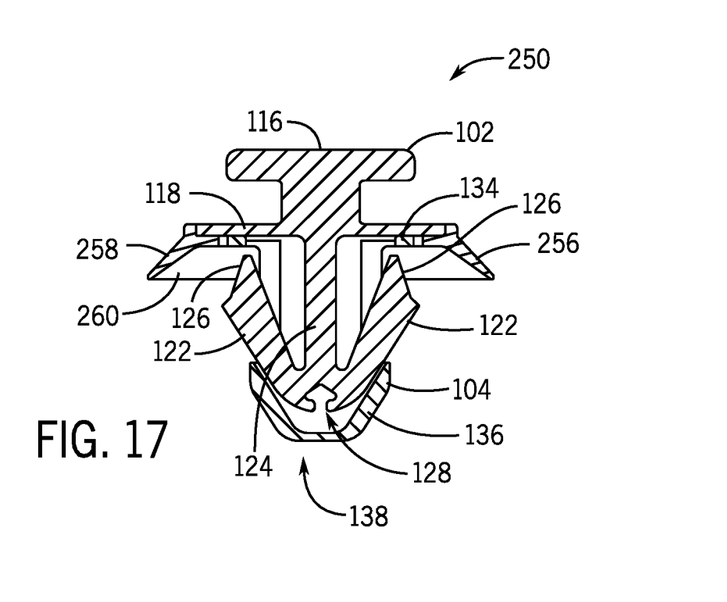
FIG. 17 is a cross-sectional side view of the fastener assembly of FIG. 14 taken along the line 17-17 of FIG. 16.

With reference to FIGS. 16 and 17, a bottom surface of the flange 118 of the fastener body 102 can engage the interior surface 260 of the seal 256 when the seal 256 is overmolded to the head portion 110 of the fastener body 102. Similar to the fastener assembly 100, when the fastener body 102 is inserted into the locator cap 104, the wings 122 extend through the opposing slots 144. When the wings 122 extend through the opposing slots 144, the wing tips 126 are disposed proximate to the interior surface 260 of the seal 256. In particular, as shown in FIG. 17, the wing tips 126 are generally surrounded by the sloped portion 258 of the seal 256.

Figure 18:
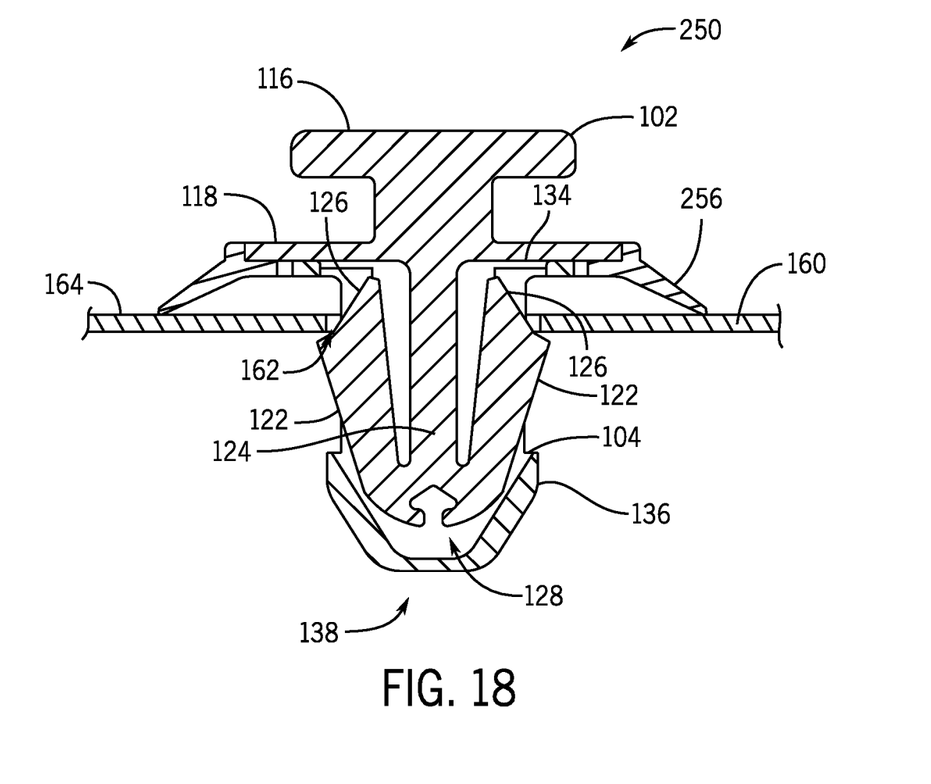
FIG. 18 is a cross-sectional side view of the fastener assembly of FIG. 14 assembled with a panel.

With reference to FIG. 18, the fastener assembly 250 can be assembled with a panel 160, similar to the fastener assemblies 100, 200. In particular, FIG. 18 illustrates the fastener assembly 250 fully assembled with the panel 160 so that an outer perimeter of the sloped portion 258 is in contact with an outer surface 164 of the panel 160 and the wings 122 are engaged with a surface that forms a perimeter of an opening 162 in the panel 160. Likewise, the base of the locator cap 104 is also in contact with the surface that forms the perimeter of the opening 162. The assembly of the fastener assembly 250 with the panel 160 provides a similar resistance to movement, as described above with reference to FIG. 8.

Figure 19:
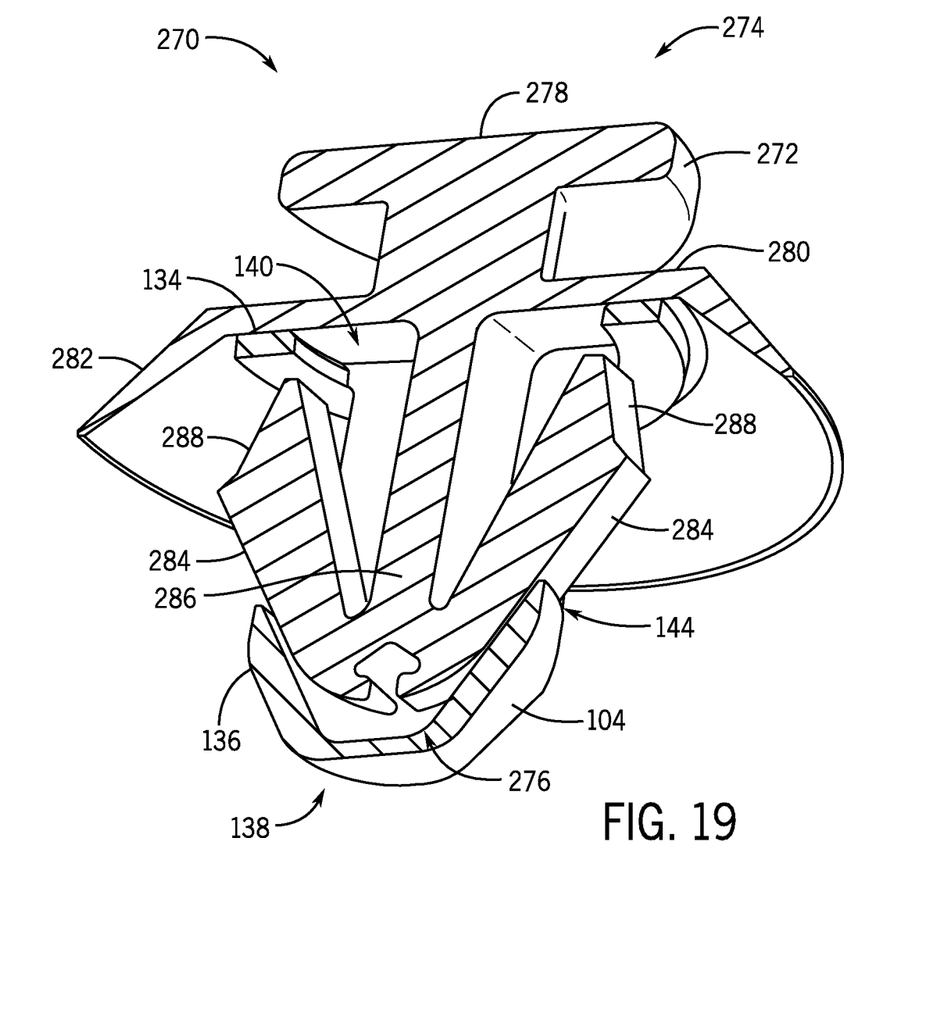
FIG. 19 is a cross-sectional isometric view of a fastener assembly according to another embodiment of the present disclosure.

FIG. 19 depicts a fastener assembly 270 according to another embodiment of the present disclosure. The fastener assembly 270 includes a fastener body 272 and the locator cap 104. Similar to the fastener body 102, the fastener body 272 includes a head portion 274 and a base portion 276. The head portion 274 includes a head 278 and a flange 280 that is spaced apart from the head 278. The flange 280 includes a sloped portion 282 that slopes generally away from the head 278. The base portion 276, similar to the base portion 112, includes first and second wings 284 that extend at an angle from opposing sides of a stem 286. Each of the first and second wings 284 includes respective first and second wing tips 288 that are angled with respect to the wings 284. A distal end of the sloped portion 276 generally surrounds the wing tips 288, similar to the sloped portion 258 of the seal 256.

The flange 280 generally defines an umbrella shape and is configured as a seal that is integrally formed with the fastener body 272. The base portion 276 of the fastener body 272 is configured to engage the locator cap 104 and an opening in a panel, similar to each of the fastener assemblies 100, 200, 250 described above. When the fastener assembly 270 is in an installed configuration, the flange 280, and particularly the engagement of the distal end of the sloped portion 282 with a panel surface, can provide a dust seal and can reduce rattle or assembly noise.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The claims are to be construed to include alternative embodiments to the extent permitted by the prior art.

To the extent used in the appended claims, the terms "including" and "in which" are used as the plain-English equivalents of the respective terms "comprising" and "wherein." Moreover, to the extent used in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

As noted previously, it will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

INDUSTRIAL APPLICABILITY

Numerous modifications to the present invention will be apparent to those skilled in the art in view of the foregoing description. Accordingly, this description is to be construed as illustrative only and is presented for the purpose of enabling those skilled in the art to make and use the invention. The exclusive rights to all modifications which come within the scope of the appended claims are reserved.

The invention claimed is:

1. A fastener assembly, comprising:
 a fastener body having a first wing and a second wing extending from a stem, the first wing defining a first wing tip and the second wing defining a second wing tip;
 a locator cap having a top flange and a base, the top flange defining an opening to an interior of the base;
 a first slot formed in the base and dimensioned to receive the first wing;
 a second slot formed in the base opposite the first slot and dimensioned to receive the second wing;
 the locator cap having first and second opposing lateral cutouts at the opening that are angularly offset from the first slot and the second slot about an axis that extends through the locator cap; and
 a seal in contact with the top flange.

2. The fastener assembly of claim 1, wherein the seal encircles each of the first wing tip and the second wing tip.

3. The fastener assembly of claim 1, wherein the fastener assembly includes a head and a radial flange, the radial flange disposed between the stem and the head.

4. The fastener assembly of claim 3, wherein the seal defines a first surface and a second surface, and
 wherein the first surface is in contact with the radial flange and the second surface is configured to contact a panel.

5. The fastener assembly of claim 1, wherein the first wing and the second wing extend from the stem at a curved nose portion.

6. The fastener assembly of claim 1, wherein the locator cap includes a tapered end opposite the top flange.

7. The fastener assembly of claim 1, wherein the seal is overmolded onto the fastener body.

8. The fastener assembly of claim 1, wherein the seal is overmolded onto the locator cap.

9. The fastener assembly of claim 1, wherein each of the first wing tip and the second wing tip are configured to engage a surface that forms a perimeter of an opening in a panel, thereby securing the fastener assembly to the panel to provide resistance to movement in a first direction.

10. The fastener assembly of claim 9, wherein the locator cap further engages the surface that forms the perimeter of the opening in the panel, thereby securing the fastener assembly to the panel to provide resistance to movement in a second direction.

11. A fastener assembly, comprising:
 a fastener body defining a head portion and a base portion;
 first and second opposing wings extending from the base portion and configured to engage a surface that forms a perimeter of a hole in a panel;
 a locator cap including a top flange and a base extending therefrom that terminates in a tapered end, the base including first and second slots dimensioned to receive the first and second opposing wings, respectively, and the top flange including an opening having first and second lateral cutouts, the lateral cutouts angularly offset from the first and second slots with respect to an axis defined by the locator cap; and
 a seal overmolded around the top flange.

12. The fastener assembly of claim 11, wherein the first and second opposing wings are biased radially outward.

13. The fastener assembly of claim 11, wherein the base is configured to engage the surface that forms the perimeter of the hole.

14. The fastener assembly of claim 11, wherein the seal includes a first flared portion and a second flared portion, and
 wherein the first flared portion surrounds the top flange and the second flared portion is configured to engage a surface of the panel.

15. The fastener assembly of claim 11, wherein the head portion of the fastener body includes a radial flange in contact with the seal.

16. A fastener assembly, comprising:
 a fastener body including a radial flange and a stem extending therefrom;
 first and second opposing wings extending from the stem opposite the radial flange, each of the first and second opposing wings terminating in respective first and second wing tips;
 a locator cap including a top flange and a base extending therefrom;
 first and second opposing slots formed in the base and dimensioned to receive the first and second opposing wings;
 the locator cap having first and second opposing lateral cutouts that are angularly offset from the first slot and the second slot about an axis that extends through the locator cap; and
 a seal overmolded to the radial flange.

17. The fastener assembly of claim 16, wherein the seal includes a sloped portion and is dimensioned to encircle each of the first and second wing tips.

18. The fastener assembly of claim 16, wherein each of the first and second opposing wings extend from the stem at a rounded nose portion.

19. The fastener assembly of claim 16, wherein each of the first and second opposing wings extend from the stem at a pointed nose portion.

* * * * *